United States Patent
Abe et al.

(10) Patent No.: US 6,633,428 B2
(45) Date of Patent: Oct. 14, 2003

(54) OPTICAL MODULE

(75) Inventors: Kenichi Abe, Tokyo (JP); Yuji Hozumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 209 days.

(21) Appl. No.: 09/859,387

(22) Filed: May 18, 2001

(65) Prior Publication Data

US 2002/0041426 A1 Apr. 11, 2002

(30) Foreign Application Priority Data

Oct. 4, 2000 (JP) ........................................ 2000-304935

(51) Int. Cl.$^7$ .............................................. G02F 1/355
(52) U.S. Cl. ........................................................ 359/326
(58) Field of Search ................................ 359/326–332

(56) References Cited

U.S. PATENT DOCUMENTS

| | | | |
|---|---|---|---|
| 4,976,517 A | * 12/1990 | Kozuka et al. | 359/249 |
| 5,185,823 A | * 2/1993 | Kaku et al. | 385/2 |
| 5,335,098 A | * 8/1994 | Leyva et al. | 359/7 |

FOREIGN PATENT DOCUMENTS

| | | | | |
|---|---|---|---|---|
| JP | 4-214526 A | 8/1992 | | |
| JP | 5-142505 A | 6/1993 | | |
| JP | 8-136341 | * 5/1996 | ............. | G01J/1/02 |

* cited by examiner

*Primary Examiner*—John D. Lee
(74) *Attorney, Agent, or Firm*—Burns, Doane, Swecker & Mathis, LLP

(57) ABSTRACT

A pyroelectric crystal, e.g. a LN crystal (1), is coated with conductive films (8). When polarization charges (4) are generated on the surface of the LN crystal (1) due to its pyroelectric effect upon accumulation of stress, the presence of the conductive films (8) induces on themselves reverse electric charges (9) matching the polarization charges (4) generated on the surface of the LN crystal (1). Therefore an electric field created by the polarization charges (4) is canceled by an electric field created by the reverse charges (9) induced on the conductive films (8). The conductive film (8b) formed on a face through which signal light is transmitted is formed from a medium transparent with respect to the signal light. Therefore the light path of the signal light is not blocked by the conductive film (8b), and the polarization charges (4) generated on the signal transmissive face can be neutralized.

6 Claims, 3 Drawing Sheets

OPTICAL MODULE

CROSS REFERENCE TO RELATED APPLICATION

This application is based on Application No. 2000-304935 filed in Japan on Oct. 4, 2000, the contents of which are hereby incorporated by reference.

BACKGROUND OF THE INVENTION

1. Field of the Invention

The present invention relates to an optical module, specifically, to an optical module in which a method of holding a pyroelectric optical crystal mounted to, e.g., an optical semiconductor laser module is improved.

2. Description of the Related Art

Descriptions will be given with reference to FIG. 3 on a conventional method of fixing an optical crystal in an optical module and the operation thereof.

FIG. 3 shows an optical crystal holding portion in the case where a pyroelectric optical crystal is used in an optical module.

In FIG. 3, reference symbol 1 denotes a pyroelectric LiNbO$_3$ crystal (lithium niobate, hereinafter referred to as LN crystal), reference symbol 2 denotes a substrate, 3, an adhesive, and 4, polarization charges generated on the surface of the crystal due to the pyroelectricity of the LN crystal 1. Denoted by reference symbol 5 is a laser diode, 6, a carrier for fixing the laser diode 5 to the top face of the substrate 2, and 7, signal light emitted from the laser diode 5.

The LN crystal 1 is a birefringent crystal. It works on the signal light emitted from the laser diode 5 to change the polarization of the light 7, and the amount of change in polarization is dependent upon the wavelength. Therefore the LN crystal 1 is used as a wavelength discriminating element. The adhesive 3 is used to fix the LN crystal 1 to the substrate 2 in the optical module.

As described above, conventional optical modules directly apply an adhesive to a substrate in the module to fix optical components to be mounted in the module. Otherwise, the conventional optical modules use a holder to fix the components by tightening a screw or by soldering.

However, fixing a pyroelectric crystal with the use of an adhesive has a problem, for it is incapable of keeping the optical characteristic of the crystal stable for a long period of time as detailed below.

The LN crystal 1, the substrate 2 and the adhesive 3 have different linear expansion coefficients. In a long term use, minute changes in temperature in the LN crystal 1 lead to accumulation of stress due to the difference in linear expansion coefficient among the three in the LN crystal 1. As shown in FIG. 3, the stress accumulated in the LN crystal 1 causes the pyroelectricity of the LN crystal 1 to generate polarization charges 4 on the surface of the crystal, and then the generated polarization charges 4 create an electric field. It has been found that the created electric field affects the LN crystal 1, with the result that its optical characteristic, e.g., birefringent characteristic is changed, and that the change causes variation with age in the aforementioned wavelength discriminating characteristic.

As described above, the conventional optical modules have a problem of being incapable of providing a long term stability in the operation characteristic as an optical module due to the change with age in characteristic of the optical crystal.

Furthermore, it is impossible to predict this optical characteristic change under the influence of the electric field because the change in optical characteristic is caused by application of slight stress to the bonded portion and by the remaining stress thereof. The change with age in optical characteristic thus cannot be compensated by other mechanisms, adding another problem to the conventional optical modules.

SUMMARY OF THE INVENTION

The present invention has been made to solve these problems, and an object of the present invention is therefore to provide an optical module capable of keeping the optical characteristic of a pyroelectric crystal stable for a long period of time even when the crystal is fixed by an adhesive.

According to the present invention, an optical module comprising a pyroelectric optical crystal transmitting signal light, and a substrate to which the optical crystal is fixed, is characterized in that a conductive film is formed on at least one face of the optical crystal.

Also, the optical module is characterized in that a conductive film having a transparent region with respect to the wavelength of the signal light is formed on at least one face of the optical crystal through which the signal light is transmitted.

Furthermore, the optical module is characterized in that the film formed on the signal light transmissive face of the optical crystal is formed from a material that makes the film a non-reflective coating with respect to the signal light.

DETAILED DESCRIPTION OF THE PREFERRED EMBODIMENT

Embodiment 1

Figure 1:
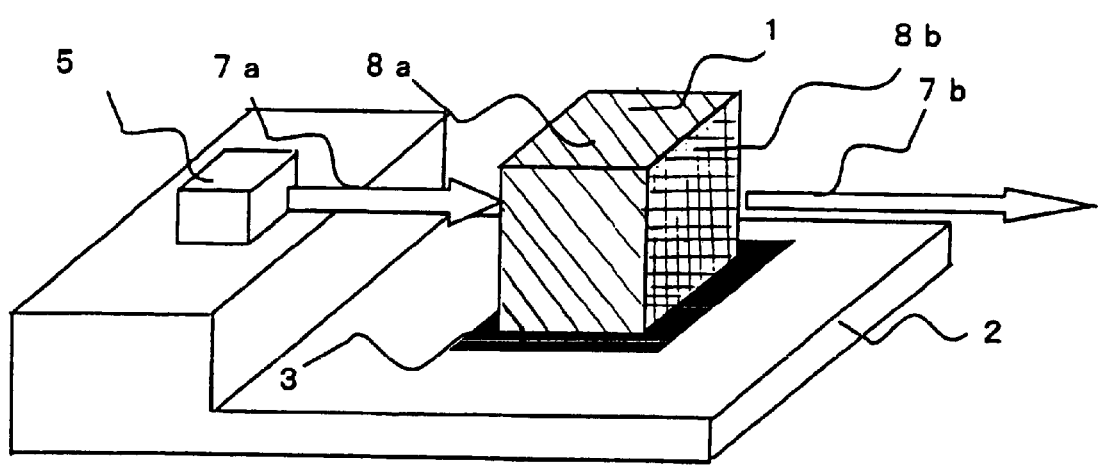
FIG. 1 is a perspective view of an optical module according to Embodiment 1 of the present invention.

FIG. 1 is a perspective view of an optical module according to Embodiment 1 of the present invention.

Figure 2:
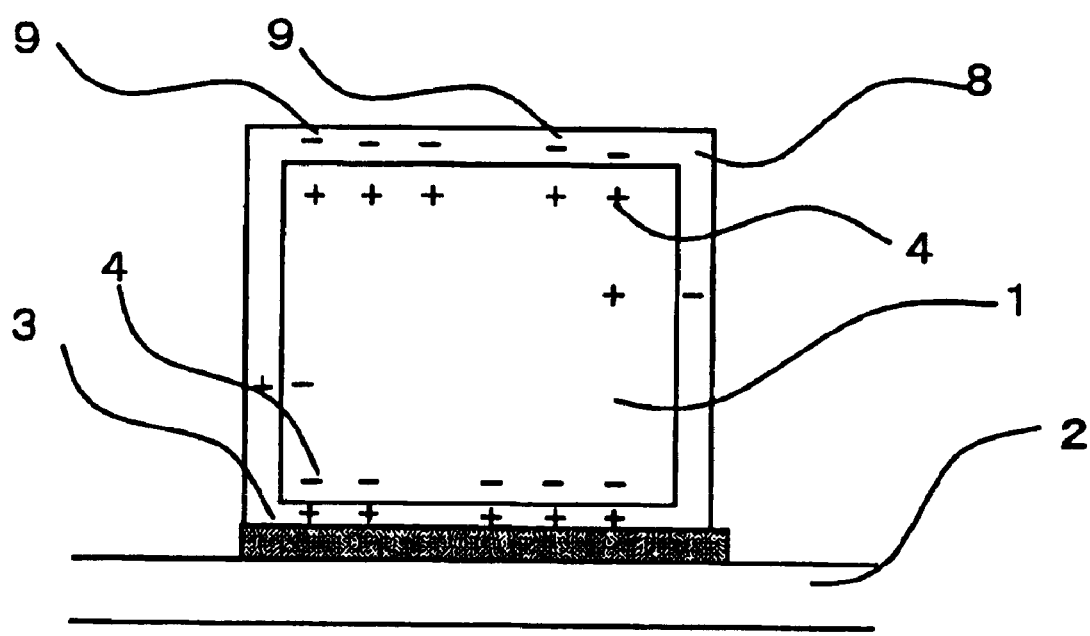
FIG. 2 is an explanatory diagram for briefing an effect provided by Embodiment 1 of the present invention.
Figure 3:
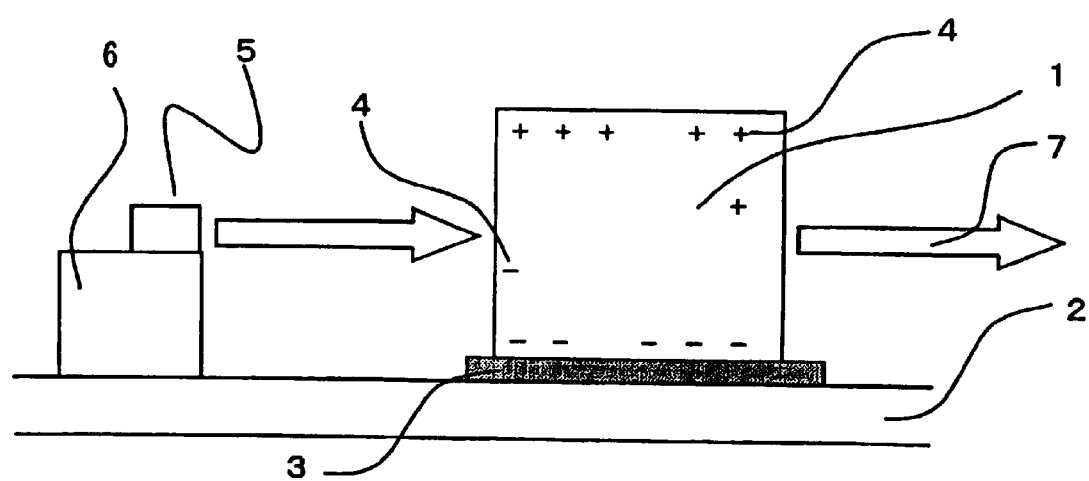
FIG. 3 is an explanatory diagram showing a pyroelectric crystal in prior art.

FIG. 2 is a sectional view of the optical module cut by the plane perpendicular to signal light beams 7a and 7b in FIG. 1 to brief an effect provided by this embodiment.

Embodiment 1 illustrated in FIGS. 1 and 2 mainly deals with a birefringent crystal mounting portion for use in an optical module for discriminating the wavelength of light. In FIGS. 1 and 2, reference symbol 1 denotes an LN crystal that is a birefringent crystal to serve as a pyroelectric optical crystal transmitting signal light. The LN crystal 1 changes the linearly polarized signal light beam 7a that is emitted from a laser diode 5 into the elliptically polarized signal light beam 7b. Reference symbol 2 denotes a substrate to which the LN crystal 1 is mounted.

The LN crystal 1 is fixed onto the top face of the substrate 2, and the joining is performed by means of an adhesive 3. The LN crystal 1 has an incident face and an exit face through which a given signal light beam is transmitted. The incident face and the exit face are each set so as to be perpendicular to the optical axis of the LN crystal 1.

Denoted by reference symbol 8a is a conductive film and 8b is a transparent conductive film.

In FIG. 1, white arrows 7a and 7b designate the signal light beams transmitting through the LN crystal 1. The signal light beams 7 in Embodiment 1 are light beams having a wavelength of 1550 nm.

The operation according to Embodiment 1 will be described next with reference to FIG. 2.

As illustrated in detail in FIG. 2, each face of the LN crystal 1 is coated with either one of the conductive film 8a and the transparent conductive film 8b. When stress is accumulated in the thus structured LN crystal 1, polarization charges 4 may be generated on the surface of the LN crystal 1 due to its pyroelectric effect. However, as shown in FIG. 2, the presence of the conductive films 8 formed on the faces of the LN crystal 1 induces on themselves reverse charges 9 matching the polarization charges 4 generated on the surface of the LN crystal 1.

Therefore, an electric field created by the polarization charges 4 is canceled by an electric field created by the reverse charges 9 induced on the conductive films 8. The harmful electric field the prior art suffers thus is not created in the LN crystal 1. As a result, the change in optical characteristic of the LN crystal 1 due to the accumulation of stress in a joined portion 3 can be prevented, thereby making it possible to provide an operation characteristic that is stable for a long period of time.

A medium transparent with respect to the signal light beams 7a and 7b is used for the conductive film 8b formed on the face through which the signal light beams 7 are transmitted. This prevents the conductive film 8b from blocking the light path of the signal light beams 7. Moreover, this makes it possible to neutralize the polarization charges 4 generated on the face of the LN crystal 1 through which the signal is transmitted, thereby avoiding the change in optical characteristic of the LN crystal 1.

The conductive film 8b, which serves as a coating of the face through which the signal light beams 7 are transmitted, is formed from a medium whose refractive index is 1.48 in 1550 nm corresponding to the wavelength of the signal light beams 7. If the conductive film 8b is formed into a thickness of 258 nm at this point, it can serve as a non-reflective coat with respect to light having the wavelength of the signal light beams 7, so that all of the light is transmitted through the LN crystal 1 whose index of refracton is 2.2. This makes it possible to reduce the reflection of light on the surface of the LN crystal 1, thereby improving the light transmission characteristic of the LN crystal 1.

The conductive film 8b formed on the signal transmissive face is a single layer film in Embodiment 1. However, the conductive film 8b may be formed of a multi-layer of films to form a non-reflective coat with at least one layer of film out of the multi-layer of films being conductive.

The adhesive 3 used in the illustration of FIG. 2 is an insulative adhesive. Alternatively, the adhesive 3 may be made of a conductive material. In this case, faces other than the face through which the signal light beams 7 are transmitted are not coated with the conductive film 8b, but instead the conductive adhesive 3 may be applied to those faces.

According to the present invention, a conductive film is formed on at least one face of an optical crystal as described above. Therefore the optical characteristic of a pyroelectric crystal used in an optical module is not affected by an electric field generated by the pyroelectricity upon accumulation of stress even when the crystal is fixed by an adhesive. The present invention is thus capable of providing an optical characteristic that is stable for a long period of time.

A conductive film having a transparent region with respect to the wavelength of the signal light is formed on at least one face of the optical crystal through which the signal light is transmitted. Therefore the coating does not block the light path running through the optical crystal, and the optical characteristic of the pyroelectric crystal used in the optical module is not affected by the electric field generated by the pyroelectricity upon accumulation of stress even when the crystal is fixed by an adhesive. The present invention is thus capable of providing an optical characteristic that is stable for a long period of time.

The film formed on the signal light transmissive face of the optical crystal is formed from a material that makes the film a non-reflective coating with respect to the signal light. Therefore the optical path running through the optical crystal is not blocked and the signal light transmission characteristic of the crystal can be improved.

What is claimed is:

1. An optical module comprising:

a pyroelectric optical crystal transmitting signal light; and a substrate to which the optical crystal is fixed, wherein a conductive film is formed on six faces of said optical crystal.

2. An optical module as claimed in claim 1, wherein a first face of said six faces is a face through which the signal light is transmitted, and wherein the conductive film formed on the first face has a transparent region with respect to the wavelength of the signal light.

3. An optical module as claimed in claim 2, wherein the conductive film formed on said first face of said optical crystal is formed from a material that makes the conductive film a non-reflective coating with respect to the signal light.

4. An optical module as claimed in claim 3, wherein the conductive film on said first face is formed of multiple layers wherein at least one of said layers is conductive.

5. An optical module as claimed in claim 1, wherein the optical crystal is fixed to the substrate with an adhesive.

6. An optical module as claimed in claim 2, wherein a second face of said six faces is a face through which the signal light is transmitted, and wherein the conductive film formed on the second face has a transparent region with respect to the wavelength of the signal light.

* * * * *